(12) United States Patent
Gudlavenkatasiva et al.

(10) Patent No.: US 8,726,077 B2
(45) Date of Patent: May 13, 2014

(54) METHOD AND SYSTEM FOR PARTITIONING DATA FILES FOR EFFICIENT PROCESSING

(75) Inventors: Bhaskar R Gudlavenkatasiva, Tampa, FL (US); Veeravijay Mariappan, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/462,464

(22) Filed: May 2, 2012

(65) Prior Publication Data

US 2012/0213354 A1 Aug. 23, 2012

Related U.S. Application Data

(63) Continuation of application No. 12/755,855, filed on Apr. 7, 2010, now Pat. No. 8,205,114.

(51) Int. Cl.
*G06F 11/00* (2006.01)

(52) U.S. Cl.
USPC .......................................................... 714/15

(58) Field of Classification Search
USPC .......... 714/15, 16, 25–27, 37, 38.1, 39, 48–50
See application file for complete search history.

(56) References Cited

U.S. PATENT DOCUMENTS

| | | | | |
|---|---|---|---|---|
| 5,819,291 | A * | 10/1998 | Haimowitz et al. | 1/1 |
| 5,832,068 | A * | 11/1998 | Smith | 379/114.14 |
| 6,052,448 | A * | 4/2000 | Janning | 379/115.01 |
| 6,970,880 | B2 * | 11/2005 | Camarillo | 1/1 |
| 6,976,024 | B1 * | 12/2005 | Chavez et al. | 1/1 |
| 7,065,192 | B2 * | 6/2006 | Danzl et al. | 379/114.01 |
| 7,092,502 | B2 * | 8/2006 | Mohn et al. | 379/201.01 |
| 7,756,873 | B2 | 7/2010 | Gould et al. | |
| 8,205,114 | B2 * | 6/2012 | Gudlavenkatasiva et al. | 714/15 |
| 8,355,485 | B2 * | 1/2013 | Schultz | 379/112.06 |
| 2003/0041068 | A1 | 2/2003 | Camarillo | |
| 2005/0114369 | A1 | 5/2005 | Gould et al. | |
| 2007/0199985 | A9 * | 8/2007 | Truitt et al. | 235/380 |
| 2007/0299868 | A1 | 12/2007 | Huomo et al. | |

* cited by examiner

*Primary Examiner* — Nadeem Iqbal

(57) ABSTRACT

An approach is provided for fast processing of data files. A plurality of records are received from a source system. The records are validated against a predetermined data source. An error notification is generated based on the validation. The validated records are partitioned based on a unique parameter. The partitioned records are transformed according to a format specified by a target system. The transformed records are selectively corrected.

15 Claims, 11 Drawing Sheets

FIG. 5

| STATE 501 | SITE/WC 503 | CLLI 505 | RATE CENTER 507 | TN 509 | TN STATUS 511 | TN CATEGORY 513 | LNP TYPE 515 | TNP TYPE 517 | •••• |
|---|---|---|---|---|---|---|---|---|---|
| RELEASE DATE 519 | RD OVERRIDE 521 | AGING CLASS SVC 523 | DID FLAG 525 | CTX FLAG 527 | EXCLUSION REASON CODE 529 | BLOCKING REASON CODE 531 | LEC CARRIER NAME 533 | LEC CONTACT NAME 535 | LEC PHONE NAME 537 |

500

METHOD AND SYSTEM FOR PARTITIONING DATA FILES FOR EFFICIENT PROCESSING

CROSS REFERENCE TO RELATED APPLICATIONS

This application is a continuation of U.S. application Ser. No. 12/755,855, filed Apr. 7, 2010, the entirety of which is incorporated herein.

BACKGROUND INFORMATION

Service providers, e.g., telecommunications service providers, engage in the handling of voluminous data in the conduct of normal business services and functions. For example, the proliferation of Internet applications and services, such as Voice over Internet Protocol (VoIP), and the popularity of cellular communication systems have resulted in the continual processing of telephone numbers on a large scale. It is observed that modern consumers enjoy near instant service with respect to activation of telephone accounts, and associated services. Managing such data (with tens of millions of records) poses a significant challenge in terms of processing capability and concomitant delay. Due to the intense competition among service providers, delay, however minimal, can result in consumers not subscribing to the relevant services. Hence, loss of revenue is a real consequence of data processing delays.

Therefore, there is a need for an approach that enables fast processing of large data files.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 5 is a diagram of an exemplary data format output from the data processing platform of FIG. 1, according to one embodiment;

DESCRIPTION OF THE PREFERRED EMBODIMENT

A preferred apparatus, method, and software for providing fast processing of large data files are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to processing files relating to telephony services involving the management of telephone numbers, it is contemplated that various exemplary embodiments are also applicable to other services and data.

Figure 1:
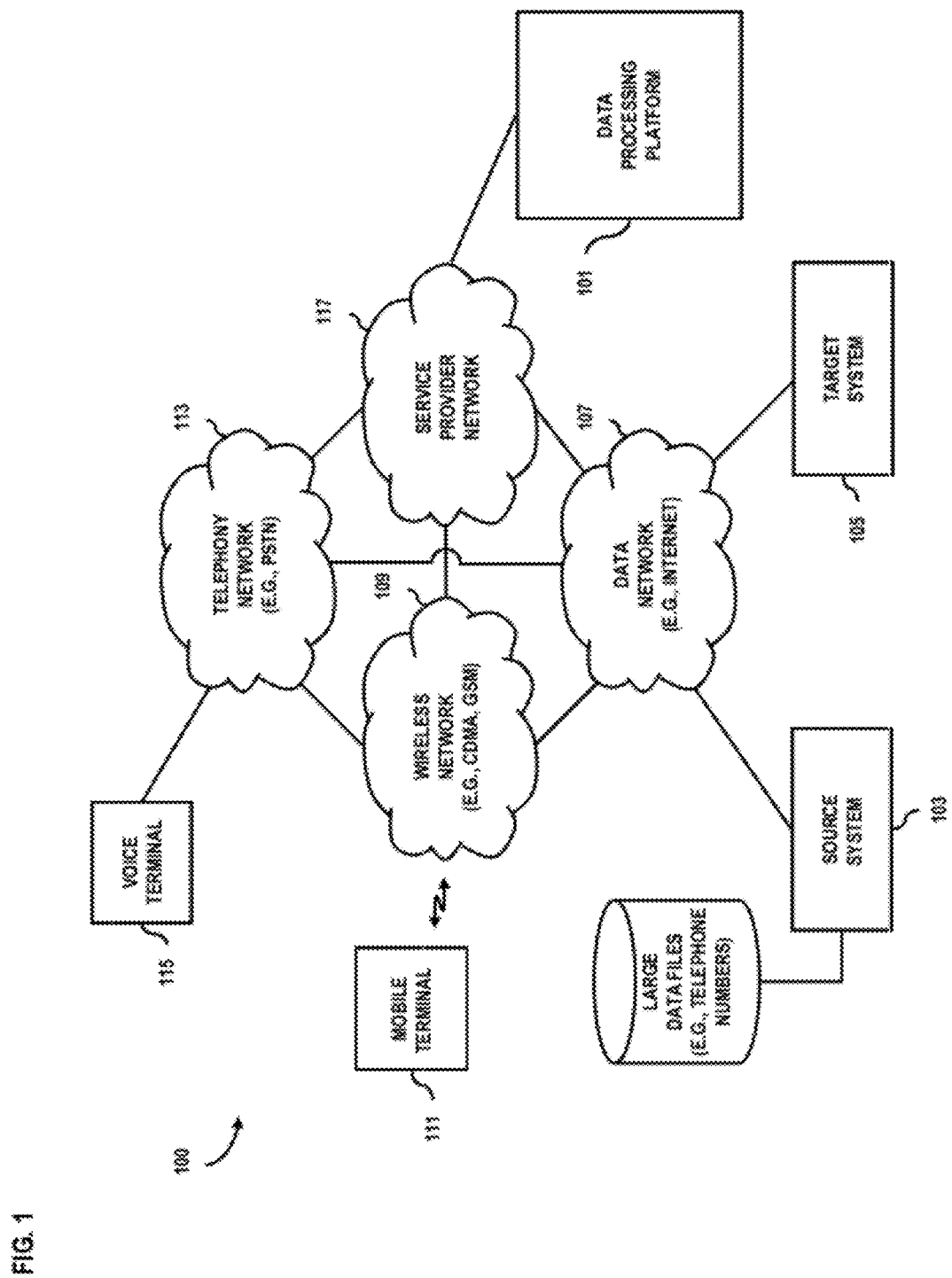
FIG. 1 is a diagram of a system configured to provide processing of large data files, according to an exemplary embodiment.

FIG. 1 is a diagram of a system configured to provide fast processing of data, according to an exemplary embodiment. For the purposes of illustration, system 100 is described with respect to a mechanism for supporting processing of large files in support of telecommunication services. As mentioned, in the case of telecommunication service providers, the efficient processing of telephone numbers is critical to maintaining a competitive edge. It is consequently of great importance for service providers to keep track of telephone number usage and assignments by processing existing pools of telephone numbers to identify numbers (such as invalid numbers and telephone numbers) that are not in current use. Given that there may be a large amount of such data—and that processing large amounts of data requires a vast amount of computing resources as well as a substantial amount of time—it is desirable to process files containing these substantial amounts of data as fast as possible by utilizing the least amount of processing resources as possible. Processing large files in a short amount of time enables service providers and various authorities to efficiently assign unused telephone numbers and forecast requirements—e.g., future number shortages, etc. Additionally, the availability of new numbers enables a server provider to sign up new subscribers more effectively.

As shown, processing platform 101 is connected to both a source system 103 and a target system 105. The source system 103 can be associated with a single entity (organization, business, etc.) or multiple distinct entities. Similarly, the target system 105 can be operated by one or more entities. In some embodiments, the source system 103 and target system 105 utilize database management systems, wherein data can be stored in one or more data containers, each container contains records, and the data within each record is organized into one or more fields. For example, in relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

According to certain embodiments, source system 103 and target system 105 utilize different data formats for data of common interest to both systems 103 and 105. It is noted that incompatibility of data can involve the actual data structure (as more fully explained with respect to FIGS. 4 and 5). In this example, data processing platform 101 extracts or otherwise receives files containing large amounts of data from the source system 103 and performs processing of the data. As used herein, "large" refers to a quantity of files and/or records that imposes substantial delay for a single processor; thus, what constitutes large can very depending on the data processing environment.

Under the scenario of FIG. 1, source system 103 may be associated with a telephone service provider, a central office, a tandem office or any other entity that supplies data files to be processed by platform 101. The target system 105 may similarly be associated with a telephone service provider or any other entity such as a forecasting authority (e.g., National Forecasting and Planning System-NFPS) that requires access to the processed data. Once the data, which may include information relating to telephony services (e.g., telephone numbers, equipment, etc.), are processed by platform 101, they are then supplied to the target system 105 for storage. The target system 105 can subsequently utilized the data for various purposes, such as estimating telephone number shortages, predicting telephone number usage requirements, and etc.

In the example of FIG. 1, system 100 includes various communication networks, such as a data network 107 and wireless network 109; these networks 107 and 109 can support telephony services for a mobile terminal 111 to communicate over a telephony network 113 (e.g., Public Switched Telephone Network (PSTN). In this manner, mobile terminal 111 can place and receive calls from a voice terminal 115. For the purpose of illustration, the wireless network 109 can include a radio network that supports a number of wireless terminals, which may be fixed or mobile, using various radio access technologies. According to one exemplary embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth™, ultra-wideband (UWB), the IEEE 802.22 standard, etc.

According to certain embodiments, a service provider network 117 includes the data processing platform 101; under this arrangement, the data processing service can be provided as a managed service by a service provider. It should be noted that various other types of networks may also be present within system 100 and are not limited to the described systems. Subscribers are also shown within FIG. 1 in communication with the assortment of networks. It should also be noted that the target system 105 may be associated with one or more of the described networks including wireless network 109 and telephony network 113.

In certain embodiments, processing platform 101 retrieves data from source system 103 over data network 107 for processing in form of files—e.g., raw data files. Various secure file transfer protocols may be used to convey these files from source system 103 to processing platform 101, and from processing platform 101 to target system 105. The connections or links that carry the data files may include both wired (e.g., coaxial cable, twisted pair, fiber optic cable) as well as wireless connections.

Figure 2:
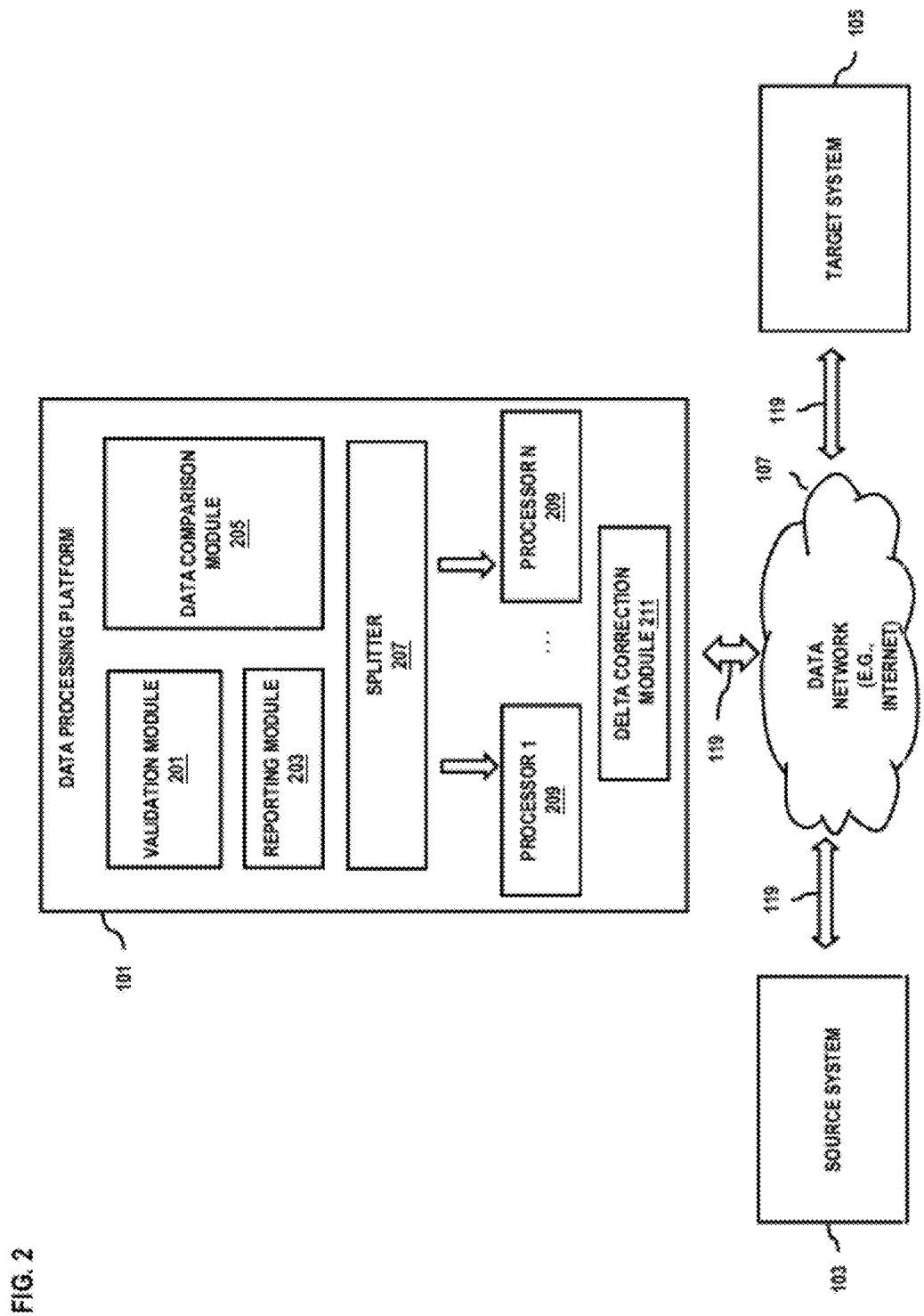
FIG. 2 is a diagram of a data processing platform utilized in the system of FIG. 1, according to an exemplary embodiment.
Figure 3:
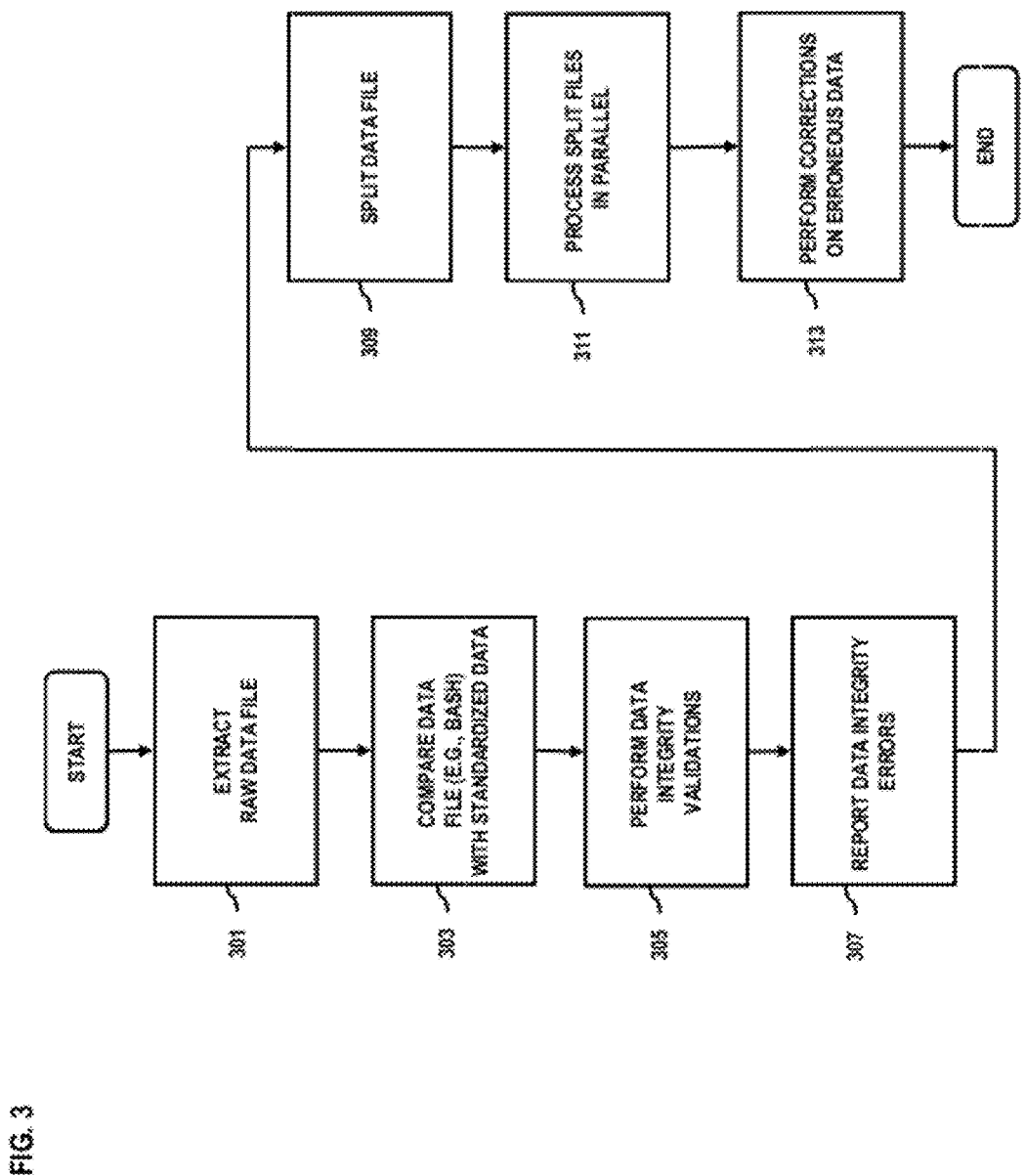
FIG. 3 is a flowchart of a process for extracting and correcting data, according an exemplary embodiment.

Processing of the data files can executed on processing platform 101, as now explained with respect to FIGS. 2 and 3.

FIG. 2 is a diagram of a data processing platform utilized in the system of FIG. 1, according to an exemplary embodiment. By way of example, data processing platform 101 comprises various modules to efficiently convert data from a source database to a target database: a validation module 201 configured to validate data records, a reporting module 203 configured to generate reports (e.g., fall out report) relating to the validation process as well as other reports, a data comparison module 205 configured to compare the records to predetermined data source, a splitter 207 configured to partition the records for parallel processing, one or more processors 209 configured to process the partitioned records, and a delta correction module 211 configured to modify the records to correct errors within the records. Although processors 209 are shown to be part of the data processing platform 101, it is contemplated that the processors can reside externally from the platform 209; moreover, these processors can be implemented as multiple servers, work stations, mainframes, or a combination thereof. These modules 201-211 collectively implement the data processing functionality, which is explained with respect to FIG. 3.

FIG. 3 is a flowchart of a process for extracting and correcting data, according an exemplary embodiment. In step 301, the process performs extraction of a raw data file from source system 103. The raw data file may contain, in one embodiment, represent tens of millions of telephone numbers and associated information, including, for example, update dates, status codes, switch number, identification numbers, etc. As mentioned, such a large data file conventionally results in substantial processing delays. The process involves transferring the content of the raw data file from the source system 103 to the data processing platform 101 over the data network 107, in an exemplary embodiment, using secure links using a secure file transfer protocol, such as Secure Shell (SSH) File Transfer Protocol (also denoted as Secure File Transfer Protocol (SFTP)). The SSH protocol defines three components: Transport Layer Protocol for server authentication, confidentiality, and integrity; User Authentication Protocol for authenticating user or client; and Connection Protocol for multiplexing encrypted tunnels over logical channels. Further details of the SSH protocol are provided in, for example, the Internet Engineering Task Force (IETF) Request for Comment (RFC) 4251, which is incorporated herein by reference in its entirety.

Once the file securely arrives via the file transfer session at processing platform 101 and the information is extracted, the data file is combined and compared with a standard (or predetermined) data source, as in step 303. According to one embodiment, the data file is "bashed" against this data source; that is, the file can be processed using a bash shell script.

Also, data integrity validations are performed, per step 305, based on the result of the comparison. The data comparison module 205 and validation module 201 can operate in conjunction to perform these comparison and validation steps. In this manner, errors within the raw data file can be identified; for example, these errors include missing telephone numbers, missing data fields, invalid telephone number groups, etc. By comparing the raw data against a standard or predetermined data source, missing and incorrect pieces of information can be effectively identified. In one embodiment, this predetermined data source can specify the format, type of information (or content), or other constraints on content and/or data structure.

Once the validation is completed, any errors that arise are consequently reported, as in step 307, by the data reporting module 203. These errors may then be automatically or manually corrected and any missing/invalid information may be replaced with the correct data. Following the reporting of the errors (e.g., fallout report), the data file, as in step 309, is split or partitioned into smaller files by splitter 207 based on a predetermined unique parameter or criterion. In one embodiment, the basis by which the large data file may be split into smaller ones may include a parameter such as an equipment identifier field (e.g., a Common Language Location Identifier (CLLI)), which is basically an alphanumeric descriptor used to identify switches and points of interconnection within a telephone network, such as PSTN 113. Alternatively, the files may be split based on other parameters, such as area codes, update dates, and etc.

The split files are distributed across one or more processors 209, which process the data within each smaller file in parallel (step 311). The size of the split file can be determined based on the type or capabilities of processor 209. Processing the smaller files using more than one processor in parallel results in an overall reduction in processing time compared to a single processor. In addition, the partition permits selective processing in which only certain records are processed, thereby further streamlining how the data is handled.

Once the processing of the split files is complete, the delta correction module 211 is engaged to perform the necessary processing of delta data, as in step 313, arising as a result of correcting the erroneous data reported (as in step 307). Delta data may be considered to essentially correspond to the difference between the original raw data and the corrected data.

For the purpose of illustration, the above process can be applied to data files that support telephony services, as explained below.

Figure 4:
FIG. 4 is a diagram of an exemplary format of raw data supplied to the data processing platform of FIG. 1, according to one embodiment.

FIG. 4 is a diagram of an exemplary format of raw data supplied to the data processing platform of FIG. 1, according to one embodiment. As seen, a raw data format 400 includes telephone number records and related information. In certain embodiments, the telephone numbers comply with the North American Numbering Plan (NANP). Accordingly, the format 400 by which the raw data is presented can include various data fields: Numbering Plan Area (NPA) number 401, NXX number 403, and XXXX line number 405. The number corresponding to the NPA 401 in a 10-digit telephone number is essentially the 3 digit area code of the telephone number, whereas the NXX 403 is the 3 digit central office or exchange code. The XXXX line number 405 is in turn the 4 digit number that corresponds to the subscriber number. It is contemplated that other numbering plans can be utilized.

In addition to the described fields, the raw data format 400 encompasses fields that are reserved for status codes 407 (the status code represents the status of the telephone number in the source system. Example of status codes are 0—Available, 1—Reserved, 2—Assigned, 3—Aging, 4—Suspended, 5—Working, 7—Closed, 8—Hold 9—Protected etc.) and update date 409 that is typically indicated with the day, month and year of the update, such as "26-Jan.-2010" By way of example, this update date may correspond to when the telephone number was last updated in the source system 103.

Furthermore, a port indicator field 411, a switch CLLI field 413, a category identifier (ID) field 415, and group ID field 417 are part of the raw data record as well. The group ID field 417 typically represents the block of telephone numbers to a particular group. Examples of group ID field are as follows: 1—Number Administration, 2 Order Entry, 10 Local Service Center, 20—Centrex, 4—Internal, 50—This group is for resale. The category identifier (ID) field 415 represents the kind of service being provided by that the particular telephone number. Examples of category ID field are as follows: 0 General, 32 Voice mail, 35 E911, 60—Inventory Control, 105—Customer specific etc. The CLLI field 413 is typically an 11 digit alphanumeric string that identifies the switches and points of interconnection in the network associated with the telephone number such as "IRVECAEIDS0." The category ID 416 and group ID 417 fields are numeric entities as opposed to alphanumeric. One example of an entry that may be found within the raw data file (which comprises millions of records) is as follows: 213,330,1002,0,26-Jan.-2010,IRVE-CAEIDS0,0,2. The first three fields correspond to the telephone number such as (213)-330-1002, whereas the rest of the fields correspond to the date of update, CLLI number, group number, etc.

As mentioned, all entries within the raw data file are compared with standardized data; and data integrity validations are performed. Once the data integrity errors are reported, the file is split, whereby the split files and delta data are processed. Thus, the processing platform 101 outputs a sequence of processed records that are to be used by the target system 105. An exemplary format for the output that is provided to the target system 105 is described below.

FIG. 5 is a diagram of an exemplary data format output from the data processing platform of FIG. 1, according to one embodiment. In this example, the target system 105 has requirements for the data format; such requirements can be determined by the data processing platform 101. As shown, output format 500 comprises various fields that include the translated raw data received by the source system 103 based on specifications of the target system 105. These fields, according to one embodiment, include a combination of numeric and alphanumeric entries such as the state code 501 corresponding to a two character code that identifies the state, province or territory and a two digit site/wire center (WC) code 503. The CLLI field 505 corresponds to an 11 digit alphanumeric number identifying the Local Exchange Routing Guide (LERG) CLLI. The LERG is basically a database that identifies which service provider (e.g. telephone company) owns a specific NPA/NXX and may be used as the standardized data supplied to the processing platform 101. The rate center field 507 is also contained in the LERG and corresponds to the geographic area that is used to distinguish rate boundaries in which calls are rated (i.e., priced) the same. The code corresponding to the rate center identifies the geographic area (i.e. locality, town, or city) served by a particular NPA/NXX combination. The area designated as TN 509 contains the 10-digit telephone number, whereas the area 511 contains a code that conveys information on the status of the telephone number and field 513 contains information on telephone number category.

The other fields of the output format 500 include fields 515 and 517, which specify codes that identify the local number portability (LNP) and TNP types, respectively. Also, fields 519 and 521, respectively, comprise information on the release date and RD override. Format 500 can additionally indicate the following fields: an aging class service (SVC) field 523, a direct inward dial (DID) flag 525, a centrex (CTX) flag 527, an exclusion reason code field 529, and a blocking reason code field 531. Moreover, output format 500 includes a LEC carrier name field 533, a LEC contact name field 535, and a LEC phone name field 537. It is noted that other fields (or fields may be omitted) may be specified, depending on the target system 105.

Figure 6A:
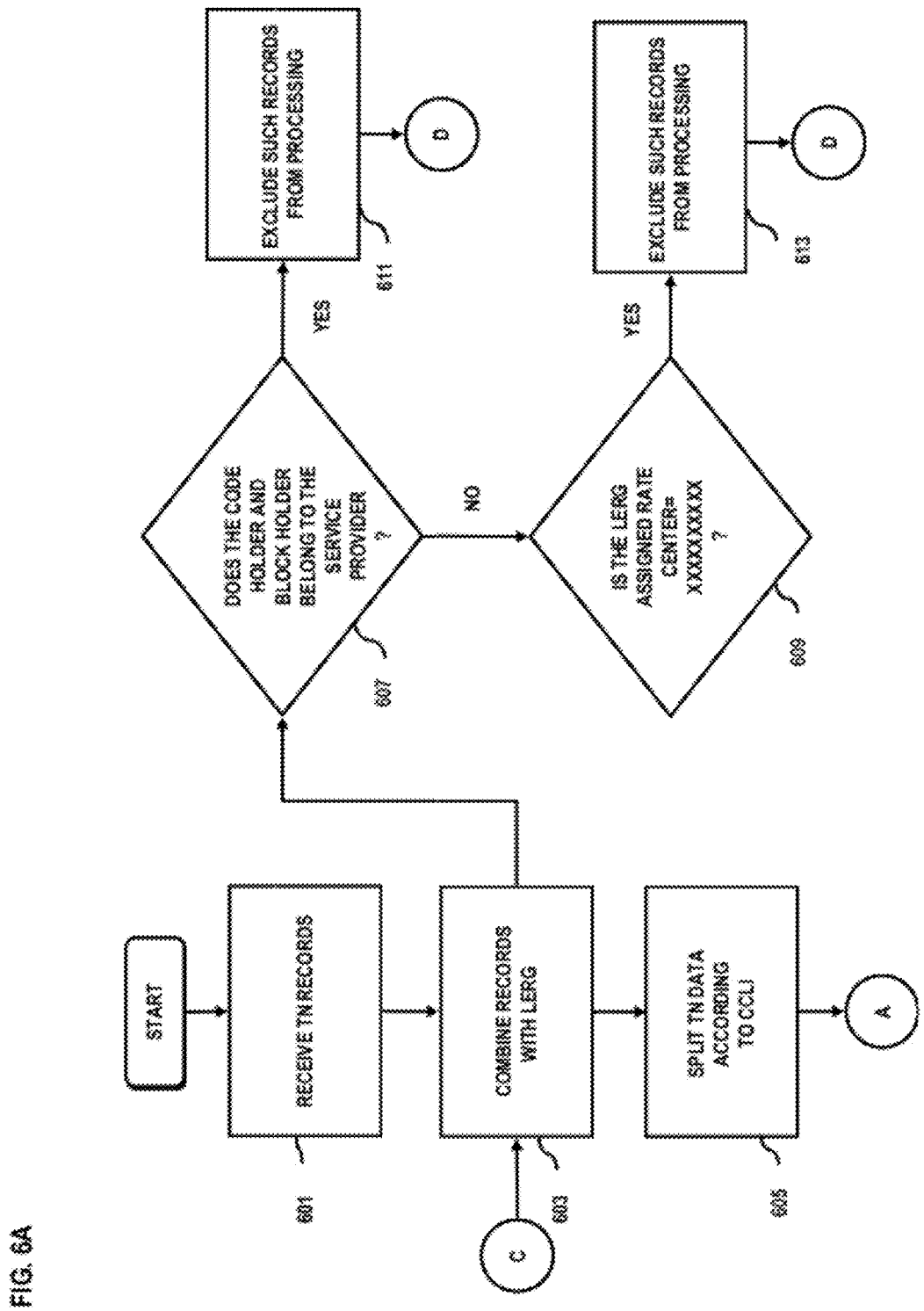
FIGS. 6A-6C are flowcharts illustrating the raw data processing stages, according to an exemplary embodiment.
Figure 6B:
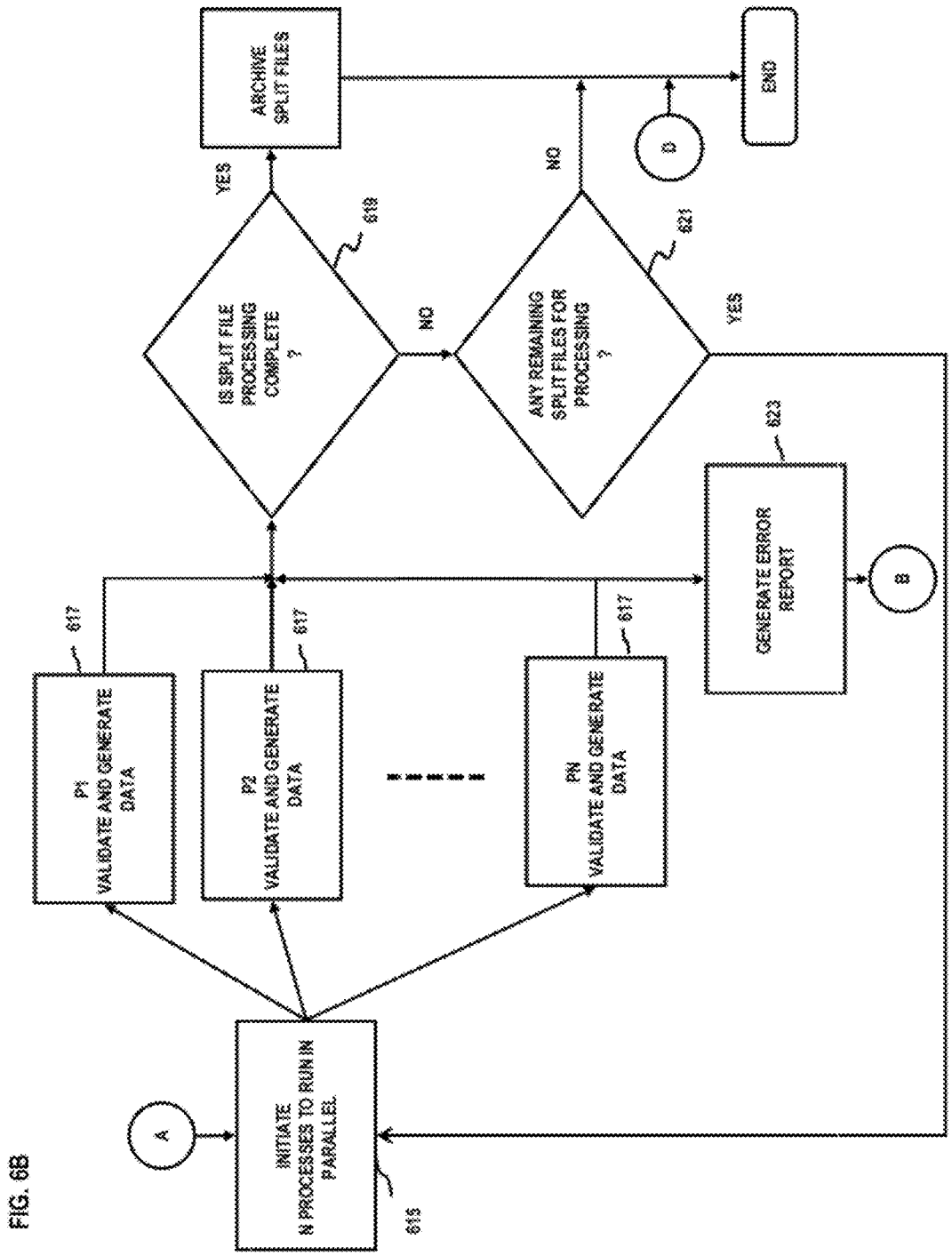
Figure 6C:
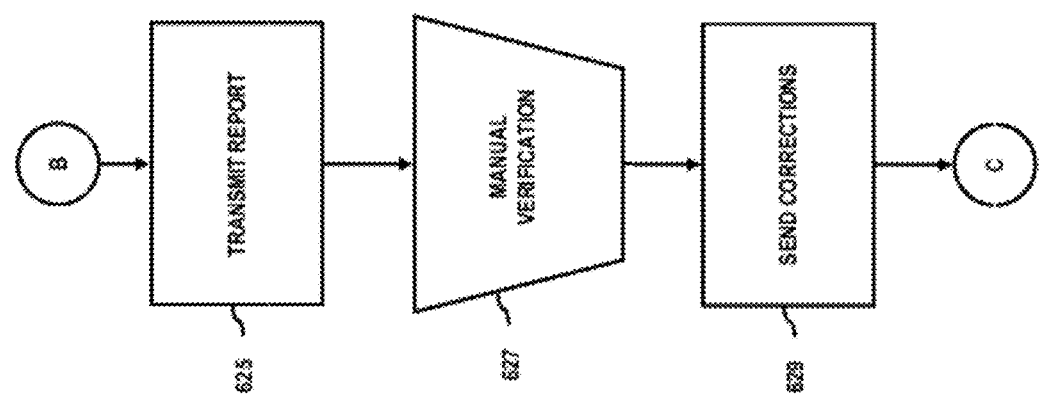

The above data of FIGS. 4 and 5 can be processed according to the procedure of FIGS. 6A-6C.

FIGS. 6A-6C are flowcharts illustrating the raw data processing stages, according to an exemplary embodiment. Under this scenario, a service provider (e.g., a telephony company) may want to manage all the telephone numbers it has on file (or own). Such management may entail identifying unused numbers, erroneous numbers, invalid group/status or category as well as classifying numbers according to CLLI or update date, or even according to state. Initially, the processing platform 101 receives telephone number (TN) data in a large file, as in step 601. The next step involves combining the raw data with the data contained in the LERG to obtain state, rate center, and pooling information, as in step 603.

Once the records are combined with the information contained in the LERG, various records within the raw data file may be excluded from being processed. For example, records based on whether the code holder and block holder belongs to a specific service provider (e.g., company) can be excluded. If the service provider does indeed own (or is assigned) a specific number block, then these records may be excluded from being processed, per steps 607 and 611. On the other hand, if the company does not own a code holder and the block holder, then it is determined whether the LERG is assigned a specific rate center (per step 609). Such records are again blocked or filtered from being processed, as in step 613, if it is determined that the LERG is assigned a specific rate center.

In one embodiment, the output of the processing platform 101 as defined by the target system 105 may be to process data according to the CLLI. The process, per step 605, involves the splitting (partitioning) of telephone number data according to CLLI. According to other embodiments, the raw data may be partitioned based on other predefined parameters in addition to or in the alternative to CLLI; essentially, these unique parameters permit distinct classification of the records.

As shown in FIG. 6B, once the data is partitioned according to the predefined parameter (CLLI in this example), the processing platform 101 initiates a number of processors 209 to run in parallel, as in step 615. Each parallel process is responsible for processing a part of the raw data file and to perform data validations on the assigned group of telephone number data, as in step 617. Once the data is validated, a sequence of data, such as that conforming to format 500 of FIG. 5, is generated based on the target system specification. If it is determined, in step 619, that the split file processing is complete, the split files are archived to be subsequently sent to the target system 105. If, however, it is determined in step 621 that there are indeed split files remaining to be processed, the process branches over to step 615 where multiple processes are initiated again to process the remaining split files.

As discussed above, the multiple processes, as in step 617, validate and generate the partitioned data file. Subsequently, a report based on the identified erroneous data is produced in step 623. The records that contain erroneous data are "skipped" (i.e., excluded or omitted from processing), and the error report can be assembled as part of an error notification to a designated recipient. In one embodiment (as seen in FIG. 6C), the error notification can be distributed via email as part of a distribution group, or other forms of communication (e.g., instant messaging), as in step 625. The error report may be forwarded to an expert system, for example, for analysis. Alternatively, the receiving party can perform manual verification on the data, and sends the delta corrections, per steps 627 and 629. The corrected data is subsequently combined with the LERG data to be processed once again starting from step 603.

In certain embodiments, prior to processing the raw data file (which is retrieved from the source system 103), the target system 105 may specify various rules for processing the data. One feature that may be required by the target system 105 is for the processing platform 101 to identify missing individual telephone numbers within a block and report them as missing telephone numbers. Similarly, the target system 105 may specify that the error conditions, which triggered the generation of the error report, exist if the raw data has missing fields or if there are invalid telephone number groups, categories or status. Another criteria may be to generate errors if the raw data has a matching LERG with a specific rate center number. The target system 105 may further require the processing platform 101 to identify donated blocks of telephone numbers when matching with the LERG data where the donated blocks are those blocks that are not owned by a particular company any longer.

Figure 7:
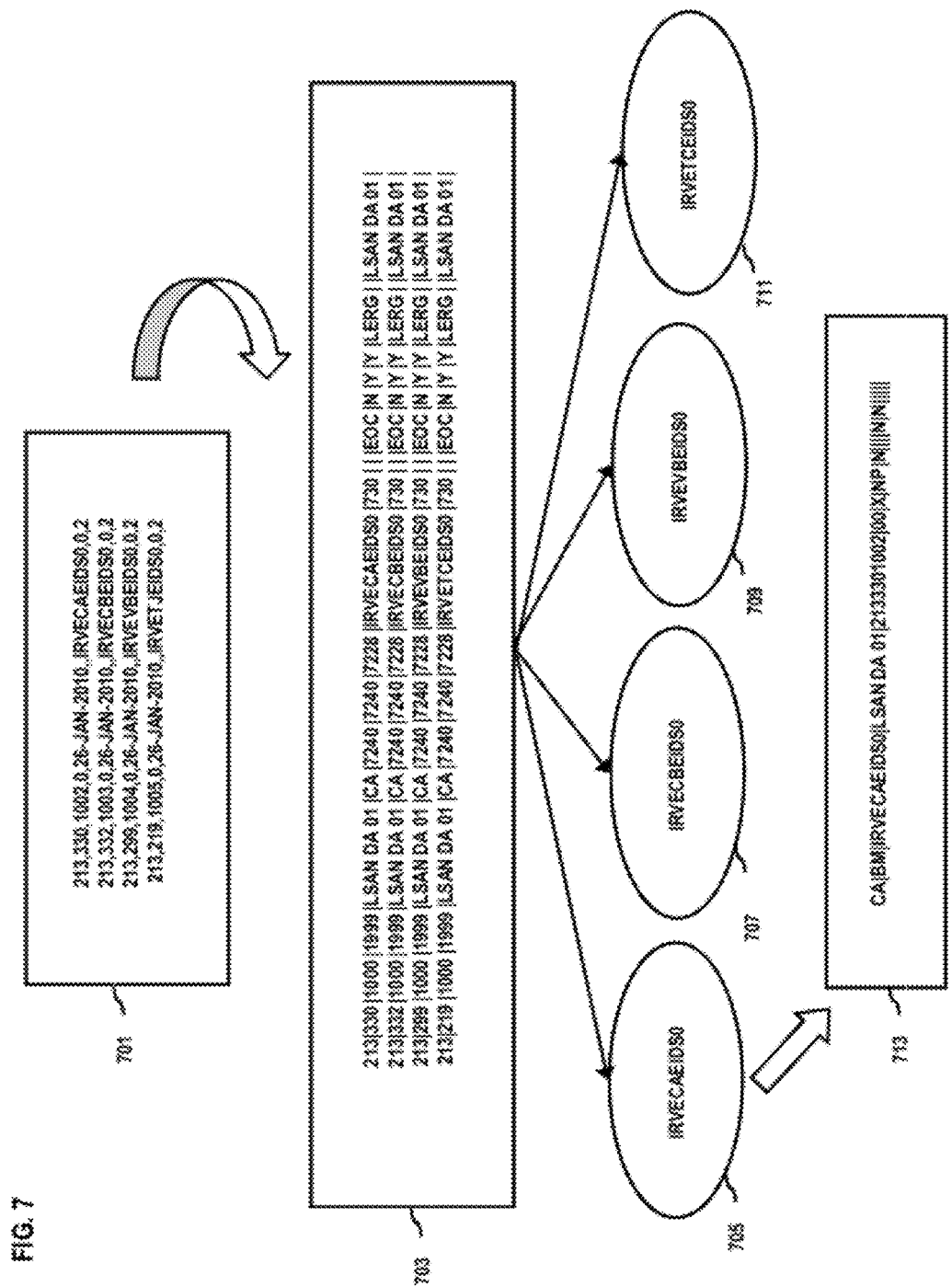
FIG. 7 is a diagram of a process involving the conversion of raw data containing information related to telephone numbers, according to one embodiment.

FIG. 7 is a diagram of a process involving the conversion of raw data containing information related to telephone numbers, according to one embodiment. In this example, a file 701 includes a sequence of raw data (shown as 4 rows) supplied by the source system 103. It can be observed that the raw data within file 701 conforms to the format described within FIG. 4. For example, the first three items 213, 330, and 1002 in the first row of the raw data file 701 corresponds to the first three items of FIG. 4; these items are the area code (NPA 401), central office code (NXX 403) and line number (XXXX 405), respectively. Similarly, the rest of the entities within the raw data file coincide with the various entities of FIG. 4

In the example shown, the raw data is validated with the LERG data by combining the LERG data with the raw data supplied by the source system 103 as illustrated in block 703. The combined data is then split into smaller files based on CLLI, depicted as 705-711 in the figure. The output file 713 extracted from the split file 705 conforms to the format of FIG. 5. For example, the first three items of the output file 713 which are CA, BM, and IRVECAEIDS0 correspond to the first three items 501, 503, and 505 respectively of FIG. 5 which are essentially the state, site/wire center (WC) code and CLLI code. This output file 713 is then supplied to the target system 105.

The above processes and arrangement, according to certain embodiments, advantageously permit rapid processing of files containing substantial amounts of data, while minimizing use of processing resources. For instance, when applied to the area of telephony services, telephone numbers can be efficiently reassigned, and fast forecasting of telephone number requirements can be performed.

The processes described herein for performing data processing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
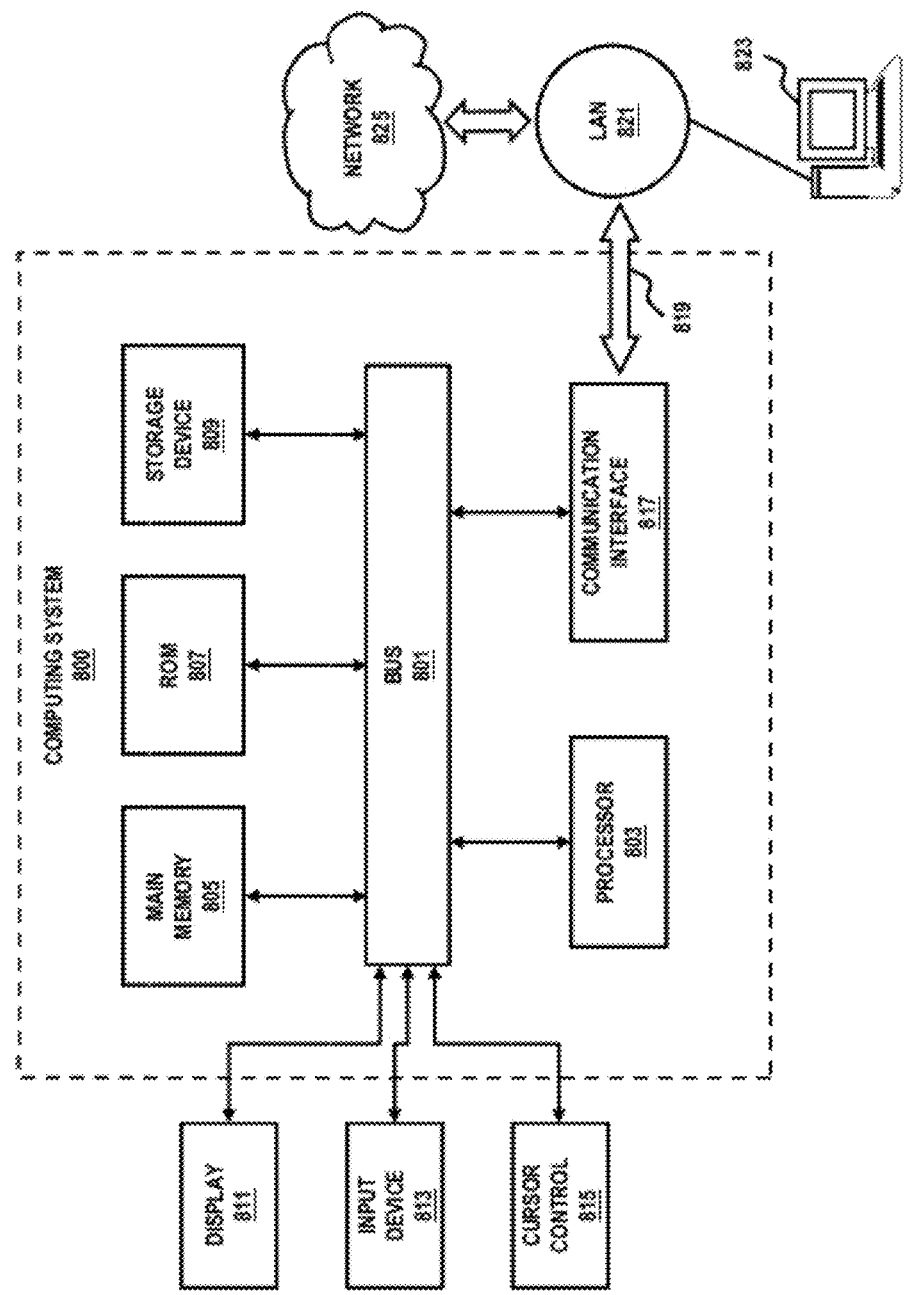
FIG. 8 is a diagram of a computer system that can be used to implement various exemplary embodiments.

FIG. 8 illustrates computing hardware (e.g., computer system) 800 upon which exemplary embodiments can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
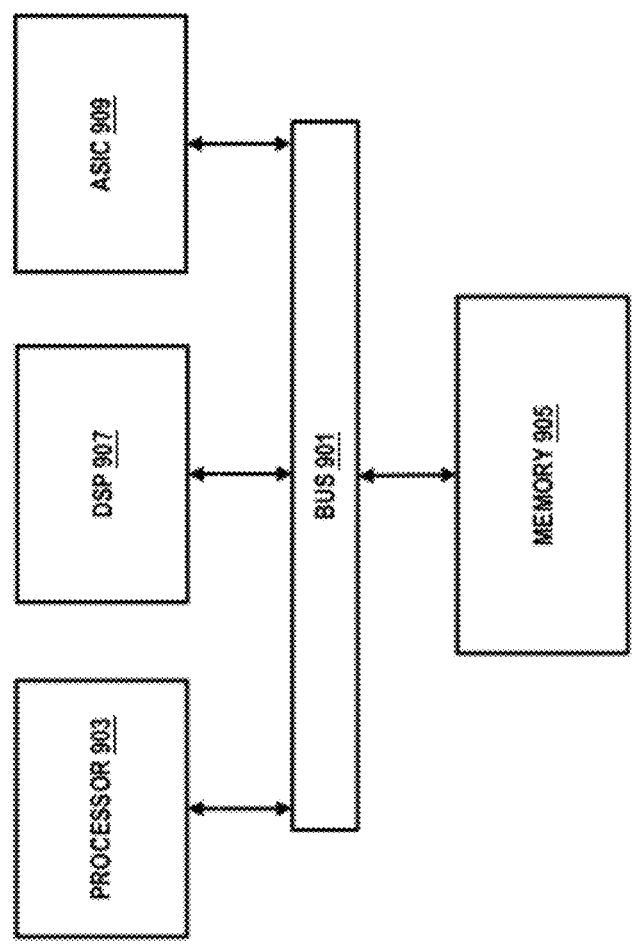
FIG. 9 is a diagram of a chip set that can be used to implement various exemplary embodiments.

FIG. 9 illustrates a chip set 900 upon which an embodiment of the invention may be implemented. Chip set 900 is programmed to present a slideshow as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 3 and 6A-6C.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving a plurality of telephone records for a telephone service provider;
determining whether one or more telephone numbers associated with one or more telephone records are assigned to the telephone service provider;
excluding one or more of the telephone records from validation if the associated telephone numbers are assigned to another telephone service provider;
validating the remaining telephone records against a predetermined data format of the telephone service provider;
generating an error notification based on the validation;
identifying telephone numbers associated with the remaining telephone records that are not in current use;
generating a report of the identified telephone numbers; and
determining a telephone number utilization forecast of the telephone service provider based, at least in part, on the identified telephone numbers.

2. A method comprising:
receiving a plurality of telephone records for a telephone service provider;
determining whether one or more telephone numbers associated with one or more telephone records are assigned to the telephone service provider;
excluding one or more of the telephone records from validation if the associated telephone numbers are assigned to another telephone service provider;
validating the remaining telephone records against a predetermined data format of the telephone service provider; and
generating an error notification based on the validation,
wherein the exclusion is performed by checking whether the telephone service provider is a code holder, a block holder, or a combination thereof, of the telephone records.

3. A method comprising:
receiving a plurality of telephone records for a telephone service provider;
determining whether one or more telephone numbers associated with one or more telephone records are assigned to the telephone service provider;
excluding one or more of the telephone records from validation if the associated telephone numbers are assigned to another telephone service provider;
validating the remaining telephone records against a predetermined data format of the telephone service provider;
generating an error notification based on the validation; and
further excluding a one or more of the remaining telephone records if the remaining records fail one or more predetermined criteria relating to a geographic region, a rate center, pooling information, or a combination thereof.

4. The method according to claim 2, further comprising:
partitioning a one or more of the remaining records that are invalidated based on a unique parameter; and
transforming the partitioned records to the predetermined data format.

5. The method according to claim 4, further comprising:
selectively performing correction of the transformed records by replacing missing or invalid data with correct data.

6. An apparatus comprising:
at least one processor; and
at least one memory including computer program code,
the at least one memory and the computer program code configured to, with the at least one processor, cause the apparatus to perform at least the following, receive a plurality of telephone records for a telephone service provider;
determine whether one or more telephone numbers associated with one or more telephone records are assigned to the telephone service provider;
exclude one or more of the telephone records from validation if the associated telephone numbers are assigned to another telephone service provider;

validate the remaining telephone records against a predetermined data format of the telephone service provider;
generate an error notification based on the validation;
identify telephone numbers associated with the remaining telephone records that are not in current use;
generate a report of the identified telephone numbers; and
determine a telephone number utilization forecast of the telephone service provider based, at least in part, on the identified telephone numbers.

7. An apparatus comprising:
at least one processor; and
at least one memory including computer program code,
the at least one memory and the computer program code configured to, with the at least one processor, cause the apparatus to perform at least the following,
receive a plurality of telephone records for a telephone service provider;
determine whether one or more telephone numbers associated with one or more telephone records are assigned to the telephone service provider;
exclude one or more of the telephone records from validation if the associated telephone numbers are assigned to another telephone service provider;
validate the remaining telephone records against a predetermined data format of the telephone service provider; and
generate an error notification based on the validation,
wherein the exclusion is performed by checking whether the telephone service provider is a code holder, a block holder, or a combination thereof, of the telephone records.

8. An apparatus comprising:
at least one processor; and
at least one memory including computer program code,
the at least one memory and the computer program code configured to, with the at least one processor, cause the apparatus to perform at least the following,
receive a plurality of telephone records for a telephone service provider;
determine whether one or more telephone numbers associated with one or more telephone records are assigned to the telephone service provider;
exclude one or more of the telephone records from validation if the associated telephone numbers are assigned to another telephone service provider;
validate the remaining telephone records against a predetermined data format of the telephone service provider;
generate an error notification based on the validation; and
further exclude a one or more of the remaining telephone records if the remaining records fail one or more predetermined criteria relating to a geographic region, a rate center, pooling information, or a combination thereof.

9. The apparatus according to claim 7, wherein the processor is further configured to:
partition a one or more of the remaining records that are invalidated based on a unique parameter; and
transform the partitioned records to the predetermined data format.

10. The apparatus according to claim 9, wherein the processor is further configured to:
selectively perform correction of the transformed records by replacing missing or invalid data with correct data.

11. A method comprising:
extracting a plurality of telephone records for a target system;
comparing the telephone records with a predetermined data format associated with the target system;
if a portion of the telephone records do not conform with the predetermined data format, selectively converting the portion of the telephone records by combining data in a local exchange routing guide into the portion of the telephone records;
partitioning the portion of the telephone records into a plurality of groups according to one or more telephone criteria including a network equipment identifier; and
validating the groups to identify errors.

12. The method according to claim 11, wherein the predetermined format relates to geographic region, a rate center, pooling information, or a combination thereof.

13. The method according to claim 11, wherein the equipment identifier specifies a switch corresponding to a telephone number.

14. The method according to claim 11, further comprising:
correcting the errors within each of the groups.

15. The method according to claim 14, further comprising:
initiating transmission of the portion of the telephone records to the target system after the correction.

* * * * *